United States Patent [19]
Grossenbacher

[11] 3,808,961
[45] May 7, 1974

[54] MACHINE FOR THE PREPARATION OF DRINKS
[76] Inventor: Ernst Grossenbacher, Oststrasse 25,, 9006 St. Gallen, Switzerland
[22] Filed: Aug. 16, 1972
[21] Appl. No.: 281,277

[52] U.S. Cl. .................................. 99/281, 99/291
[51] Int. Cl. ............................................ A23f 1/08
[58] Field of Search ............ 99/283, 290, 291, 293, 99/281, 300, 304, 305, 307, 316, 281; 126/373, 380, 376, 374

[56] References Cited
UNITED STATES PATENTS

| | | | |
|---|---|---|---|
| 2,676,585 | 4/1954 | Pappas | 99/291 |
| 3,334,571 | 7/1967 | Matty | 99/283 |
| 3,106,149 | 10/1963 | Vukasin | 99/283 |
| 3,593,650 | 7/1971 | Martin | 99/291 |

Primary Examiner—Robert W. Jenkins
Attorney, Agent, or Firm—Ernest F. Marmorek

[57] ABSTRACT

A machine for making coffee, tea or the like is provided having a platform for supporting two adjacent containers. A vertically standing housing having two chambers therein is positioned adjacent the platform. A first upper chamber in the housing contains a volume of water equal to the volume of each of the containers. Control means and heating means are located in a second, lower chamber of the housing. Passageway means provide fluid communication between the first chamber and the control means, the heating means and a liquid discharge tube that is located at an elevation at least as high as the highest level of water in the upper chamber.

8 Claims, 5 Drawing Figures

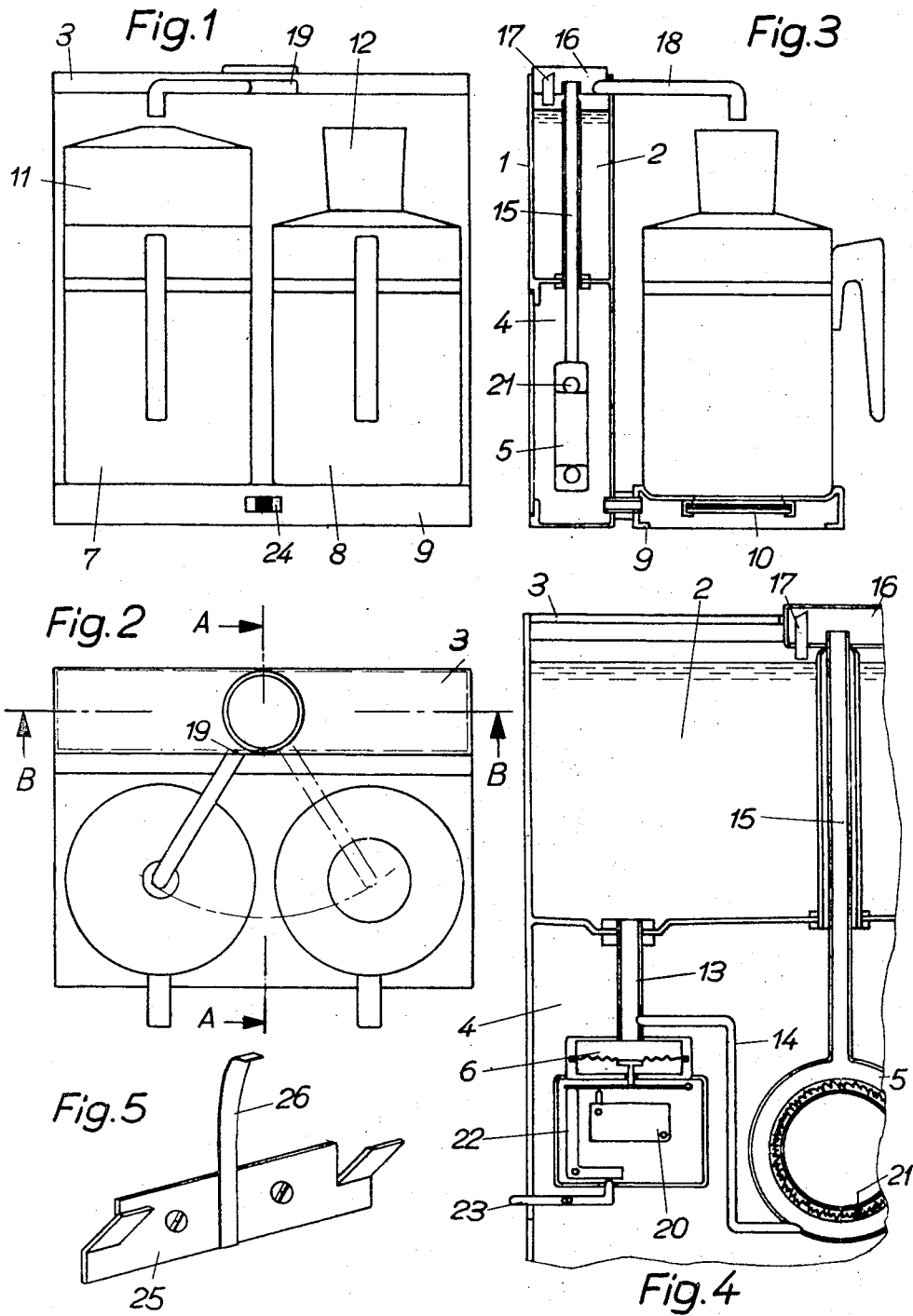

MACHINE FOR THE PREPARATION OF DRINKS

BACKGROUND OF THE INVENTION

The present invention relates generally to beverage making machines and more particularly to a machine for the preparation of drinks, such as coffee or tea or the like.

SUMMARY OF THE INVENTION

The machine comprising this invention is adapted to support two receptacles such as pitchers which, together with their respective brewing devices, are located adjacent each other on a common platform. The present invention is at least partially characterized in that there is provided a relatively narrow, flat housing the upper portion of which defines a fresh water chamber having a volume corresponding to the useful capacity of one of the pitchers. The width dimension of the housing extends over the two adjacently placed pitchers. The present invention is further characterized in that a continuous flow heater, a membrane-activated control member and all necessary connections are housed in the hollow space of the housing below the fresh water chamber.

It is therefore an object of this invention to provide an improved machine for making coffee, tea or the like.

It is another object of this invention to provide an improved machine for making two different beverages in side-by-side containers.

One embodiment of the present invention will be described in detail and explained with respect to its functions by means of the attached drawing wherein:

BRIEF DESCRIPTION OF THE DRAWING

FIG. 1 is a front elevational view of the present invention;

FIG. 2 is a plan view of the apparatus shown in FIG. 1;

FIG. 3 is a vertical, sectional view taken along line A—A of FIG. 2;

FIG. 4 is a fragmentary sectional view on an enlarged scale taken along line B—B of FIG. 2; and FIG. 5 is a pictorial view of a suspension device used in the present invention.

DESCRIPTION OF THE PREFERRED EMBODIMENT

The machine for the preparation of drinks illustrated in the drawing comprises a long, relatively narrow housing 1, the upper hollow portion of which is defined a fresh water container 2 which can be closed-off by means of a raisable and removable cover 3. In the lower, hollow space 4, there is provided a flat, rounded-off continuous flow heater 5 and a pressure-controlled element 6, responsive to the water level in the fresh water container 2. The width of the housing 1 is approximately the same as the combined width of two containers, such as pitchers 7 and 8, which are arranged one next to the other and are retained in recessed areas of a platform 9. There is also provided in the platform 9 a heating element 10 which keeps the drinks warm. The vertical dimension of the housing 1 must be such that it can support the platform 9 with the two pitchers 7 and 8 as well as superimposed brewing devices 11 for coffee and 12 for tea. The depth of the housing 1 will depend on the required volume of the fresh-water container 2, with said volume corresponding to the useful capacity of one of the pitchers 7 and 8.

The machine functions as follows:

After the fresh water container 2 is filled up with water, the water flows through a tube connection 13 and through a connection tube 14 to the membrane of the pressure controlled element 6 and to the continuous flow heater 5, respectively. From the latter, an ascending tube 15, which is insulated against cooling, is led through the fresh water container 2 above the highest possible fresh water level, into a rotatable expansion chamber 16 equipped with a vapor bypass 17 and a pivotally attached discharge tube 18. A recessed area 19 along the border of the cover, stops or limits the movement of the pivotable discharge tube 18 in such a manner that, when the tube 18 is stopped, its outlet end is always directly above the center of the brewing device 11 or 12. Through the static pressure exerted by the water column on the membrane of the pressure controlled element 6, a switch 20 is activated, which controls and provides with current a heating element 21, which is located in the continuous flow heater 5. A flow of boiling water moves through the ascending tube 15 and, via the tube 18 to either of the brewing devices 11 or 12. When the fresh water container 2 is empty, the pressure controlled element is switched off by itself. The discharge tube 18 can now be swung over to the other brewing device, either 11 or 12, and the entire process can then be repeated.

In order to prevent the continuous flow heater 5 from furnishing boiling water for a period of about 20 seconds after fresh water has been put into the fresh water container 2, such as, for example, in cases in which the brewing devices 11 or 12 are not ready yet to receive water, a locking mechanism 22 is provided at the pressure controlled element 6. This locking mechanism 22 is disengaged by the manipulation of a push button or lever 23, and the current supply to the continuous flow heater 5 is thereby reestablished. When, due to load removal, the pressure controlled element 6 is switched off, the locking mechanism 22 becomes automatically locked again.

The platform 9 is heated by means of the small heating element 10 in order to keep the finished drinks warm for as long as possible. The heating element 10 is connected in such a manner that it remains connected with the main switch 24. In order to simplify filling the container 2 with fresh water, the raisable and removable cover 3 is provided. The cover 3 includes a recessed area for the expansion chamber 16 and for the tube 18 and is designed in such a manner that, in its open stage, it covers the rear container-border in an inward direction, thus preventing any liquid from spilling to the rear during the filling operation. The rear cover plate of the machine is provided with two slots (not shown), in order to hang said machine, with one manipulation, onto mounting support tabs of a bearing strip 25 (FIG. 5) and lock it by means of a springy retaining-member 26. In case of a permanent wall mounting, a faucet which is connected to the water system can be mounted directly above the fresh water container 2 and the container 2 can be provided with a liquid level indicator in order to determine the quantity of water to be fed to the container 2.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A machine for the preparation of drinks such as coffee, tea or the like, said machine comprising:
   a platform for supporting two containers together with their respective brewing means in side-by-side relationship;
   a housing substantially spanning the width of said platform and extending above the plane thereof,
   said housing defining a first, upper chamber for water and having a volumetric capacity substantially equal to that of the individual containers and a second, lower chamber;
   a discharge tube secured to said housing at an elevation at least as high as the highest level of the water;
   control means in said lower chamber responsive to the water level in said upper chamber;
   water heating means located in said lower chamber and electrically coupled to said control means; and
   passageway means for providing fluid communication between said upper chamber and said water heating means, said control means and said discharge tube.

2. The machine in accordance with claim 1, wherein said discharge tube is pivotally mounted and wherein there is further provided limit means for positioning said discharge tube at locations directly over the containers.

3. The machine in accordance with claim 1, wherein said heating means is a continuous flow heater.

4. The machine in accordance with claim 1, wherein said control means is pressure responsive.

5. The machine in accordance with claim 1 further including means for selectively locking and unlocking said control means.

6. The machine in accordance with claim 1 further including second heating means in said platform for maintaining the liquid discharged from said tube into said container at a uniform temperature.

7. The machine in accordance with claim 1 further including bracket means for mounting said machine on a wall.

8. The machine in accordance with claim 1 further including an openable cover for said upper chamber.

* * * * *